United States Patent [19]

Melachouris

[11] 4,161,552

[45] Jul. 17, 1979

[54] METHOD FOR MAKING COMMINUTED MEATS AND EXTENDERS

[75] Inventor: Nicholas Melachouris, White Plains, N.Y.

[73] Assignee: Stauffer Chemical Company, Westport, Conn.

[21] Appl. No.: 868,954

[22] Filed: Jan. 12, 1978

[51] Int. Cl.$^2$ .............................................. A23C 21/00
[52] U.S. Cl. ..................................... 426/646; 426/583
[58] Field of Search .............................. 426/646, 583

[56] References Cited

U.S. PATENT DOCUMENTS

| | | | |
|---|---|---|---|
| 3,560,219 | 2/1971 | Attebery | 426/583 X |
| 3,930,056 | 12/1975 | Feminella et al. | 426/646 |
| 3,934,051 | 1/1976 | Eastin | 426/646 X |
| 4,036,999 | 7/1977 | Grindstaff | 426/583 X |

FOREIGN PATENT DOCUMENTS 2256005  5/1973  Fed. Rep. of Germany ........... 426/583

Primary Examiner—Robert L. Lindsay, Jr.
Attorney, Agent, or Firm—Paul J. Juettner

[57] ABSTRACT

Comminuted meats can be effectively extended using, in place of non-fat dry milk, the partially soluble modified whey solids derived by either (1) adding a divalent metal ion to a cheese whey solution and adjusting the pH to between about 6.0 and about 8.0 or (2) by adjusting the pH of a cheese whey solution containing at least 20% acid cheese whey to a value of between about 6.0 and about 8.0 to cause precipitation of the modified whey solids. Extension is equivalent or slightly better than that achieved using non-fat dry milk and/or modified non-fat dry milk with the added advantages of more uniform flavor and lower cost.

8 Claims, No Drawings

METHOD FOR MAKING COMMINUTED MEATS AND EXTENDERS

BACKGROUND OF THE PRESENT INVENTION

1. Field of the Invention

This invention relates to the extension of comminuted meats using partially soluble modified whey solids.

2. Prior Art

Comminuted meat products such as sausage and meat loaves are well known items of commerce and include those comminuted food products prepared from one or more kinds of skeletal muscle meat which may include poultry meat. These products include cooked sausage, meat patties, and non-specific loaves.

Cooked sausage is defined by the United States Department of Agriculture in 9 C.F.R., Section 319.180, and includes, for example, frankfurter, weiner, bologna, garlic bologna, knockwurst and similar products. Beef patties are defined in 9 C.F.R., Section 319.15.

Non-specific loaves as defined in 9 C.F.R., Section 319.280 include such items as luncheon meat loaves. These items generally include an extender which, for these loaves, is generally non-fat dry milk.

Sausage prepared generally from top quality meat does not require the use of an extender. However, the addition of lesser quality cuts such as flank and chuck requires the use of an extender. The Federal Standards for comminuted meats other than non-specific loaves allow up to 3.5% by weight based on the total weight of the product of non-fat dry milk or modified non-fat dry milk as the extender. In non-specific loaves, meats of lesser grade predominate. The use of an extender is essential. Non-fat dry milk in an amount of up to about 25% is generally used in non-specific loaves.

Non-fat dry milk while being an excellent extender for meats also presents certain difficulties. The taste contribution made by the non-fat dry milk varies widely depending on the source and method of manufacture of the non-fat dry milk. Even non-fat dry milk from the same source can vary in taste. The variation in taste generally results from a cooked or scalded milk flavor which is imparted to sausage and non-specific loaves using a milk that is over-heated during drying. This problem occurs frequently and sausage manufacturers are aware of and attempt to avoid difficulty.

To date, the Federal Standards for sausage allow only the use of non-fat dry milk or modified non-fat dry milk and not other milk derived protein systems as extenders. However, it is known that certain by-products from the concentrate of whey protein by dextran gel are useful in extending comminuted meats particularly cooked sausage as well as effectively enhancing the flavor thereof. This is disclosed in U.S. Pat. No. 3,930,056. It is also known that the by-products from the concentration of whey protein by dextran gel filtration or ultrafiltration when combined with sodium caseinate also effectively function as binders and emulsifiers for comminuted meats as disclosed in copending application Ser. No. 836,164, of Robert M. Lauck and Nicholas Melachouris, filed Sept. 23, 1977, entitled COMMINUTED MEATS AND BINDERS THEREFOR. See also the article by R. Lauck entitled THE FUNCTIONALITY OF BINDERS IN MEAT EMULSIONS, Journal of Food Science, Volume 40, pp. 736–740 (1975).

However, the latter product requires the blending of a by-product, which is the result of extensive processing, with sodium caseinate. Cost factors greatly retard the commerciality of this system.

SUMMARY OF THE INVENTION

In accordance with the present invention, it has now been found that comminuted meats can be successfully extended by using as an extender therefor a partially soluble modified whey solids as defined hereinafter. Substitution of the non-fat dry milk normally used in a comminuted meat formulation with the partially soluble modified whey solids can be on a weight/weight basis. Extending properties equivalent to or slightly improved over non-fat dry milk are obtained. This is surprising in view of the fact that the protein composition of the partially soluble modified whey solids is different from that of non-fat dry milk. Flavor characteristics of the final comminuted meat product are substantially uniform with no scalded milk flavor. An approximate 15% to 20% cost savings at present prices can be realized.

DETAILED DESCRIPTION OF THE INVENTION

The partially soluble modified whey solids are the precipitates obtained by either:

(1) treating a cheese whey solution, preferably containing at least 50% sweet whey, with a divalent metal ion, such as calcium, and adjusting the pH of the solution with a food grade base, such as sodium hydroxide, to between about 6.0 and about 8 as disclosed in Attebery U.S. Pat. No. 3,560,219, issued Feb. 2, 1971, the entire disclosure of which is hereby incorporated herein by reference; or (2) adjusting the pH of a raw cheese whey solution containing at least 20% and preferably at least 60% acid whey with a food grade base, such as sodium hydroxide, to a value between about 6 and about 8 as disclosed in Grindstaff U.S. Pat. No. 4,036,999, issued July 19, 1977, the entire disclosure of which is hereby incorporated herein by reference.

The cheese whey used in preparing the materials used in the present invention can be acid cheese whey, sweet cheese whey, or mixtures thereof as outlined hereinbefore. More particularly, the cheese whey can be cottage cheese whey, casein whey, cheddar cheese whey, mozarella cheese whey, Swiss cheese whey or mixtures thereof as desired. No significant difference in the end use area as disclosed herein was noted using products prepared from acid or sweet whey.

The precipitates can be formed at any temperature at which the whey solution is liquid at atmospheric pressure. The temperature is preferably from about 60° C. to 95° C. Yields increase with higher temperatures.

The partially soluble modified whey solids suitable for use in the present invention formed by either of the processes described in U.S. Pat. Nos. 3,560,219 and 4,036,999 have the following typical analysis: Lactose: 23–54% by weight; Minerals: 24–60% by weight; Protein (N×6.38): 15–27% by weight; Moisture: 3–6% by weight; Lactate: about 2–4% by weight, Citrate: about 2–3.5% by weight; and Fat: about 0.5–1.5% by weight. A typical mineral or ash content, by weight is 3% to 6% phosphorus, 6% to 12% calcium, 1.5% to 2% potassium, 1.3% to 1.5% sodium, and 0.2% to 0.4% magnesium. The partially soluble modified whey solids are available from Stauffer Chemical Company, Food Ingredients Division, Westport, Conn.

The partially soluble modified whey solids precipitate can be separated from the mother liquor and dried by any known means. Preferably, an atomizing dryer such as a spray dryer (vertical or horizontal), fluid bed dryer or flash or vacuum dryer or filter mat dryer is utilized. The pressure in the dryer can be a negative pressure such as that used in a flash or vacuum evaporator.

Preferably, a spray dryer having an inlet temperature within the range of from about 168° C. to about 182° C. and an outlet temperature within the ranges from about 110° C. to about 116° C. is used. The temperature in the dryer is not critical. However, the temperature must be high enough to effectively dry the product without causing burning or browning. The conditions of drying such as feed rate, residence time and the like can be easily discerned by one skilled in the art.

If desired, one can also include in the partially soluble modified whey solids, a small portion of a drying agent or a flow control agent selected from the group consisting of tricalcium phosphate, dicalcium phosphate, kaolin, diatomaceous earth, silica gel, calcium silicate hydrate and mixtures thereof.

The partially soluble modified whey solids described hereinbefore can be effectively added to comminuted meats as an extender while providing flavor stabilization. The comminuted meat product so produced shows more uniform flavor and good extension over like products extended with non-fat dry milk in the usual manner.

By comminuted meat is meant herein, comminuted meat food products prepared from one or more kinds of skeletal muscle meat and poultry meat. Cooked sausage can be defind as those comminuted meat products defined by the United States Department of Agriculture, in 9 C.F.R., Section 319.180, for example, frankfurter, weiner, bologna, garlic bologna, knockwurst and similar products. In addition to the sausage products described above, comminuted meat further includes beef patties (9 C.F.R., Section 319.15).

It has been found that the products of the present invention are particularly effective in extending non-specific loaves as defined in 9 C.F.R., Section 319.280. These include the luncheon meat loaves which are generally chopped or ground meat of pork, beef, veal or lamb molded into a square shape and which can contain cereals, soy and non-fat dry milk as well as other non-cereal extenders and if desired, flavorings such as chopped nuts, olives, cooked maccaroni, pistachio nuts, dried cheese and the like. These loaves can be dry cooked in the smoke house or canned and cooked in water as is the usual practice in the art. The extender for these loaves is generally non-fat dry milk. Effective extensions of the comminuted meat used in preparing these loaves can be accomplished using the partially soluble modified whey solids as described hereinbefore in place of all or a portion of the non-fat dry milk normally used.

The partially soluble modified whey solids can be added in the preparation of the comminuted meat product at such time and in such manner as extenders, such as non-fat dry milk, are normally added. The extender is generally added as a dry powder or as a blend with the spices normally used in preparing a specific comminuted meat product.

The partially soluble modified whey solids can be added to comminuted meats in meat extendingly effective amounts. An effective amount for extension ranges from about 1% to about 35% by weight based on the weight of the comminuted meat product. In connection with cooked sausage, as defined above, the present legal limit for extenders is 3.5% by weight based on the final weight of the sausage. The partially soluble modified whey solids in amounts not exceeding 3.5% are effective as extenders in cooked sausage in place of known extenders. In non-specific loaves, there is no legal limit on the amount of extender which can be used but the product must contain at least 65% meat. In non-specific loaves, it is preferred to utilize the extender in replacement amounts for the extenders presently used (non-fat dry milk). The preferred amounts for non-specific loaves range from about 10% to about 20% by weight based on the final weight of the loaf.

Since the partially soluble modified whey solids as used in the present invention are compatible with existing extenders, both total and partial replacements of existing extenders are included within the present invention. Thus, combinations containing at least 10% and preferably at least 50% or more of partially soluble modified whey solids with the remainder being satisfied with other known extenders, such as non-fat dry milk, can be made.

It has also been found that the addition of non-extender vegetable protein sources such as soy protein to the partially soluble modified whey solids could decrease the functionality of the overall composition.

The partially soluble modified whey solids used in accordance with the present invention provide improved quality meats over and above the quality obtained using currently available meat binders. These improvements include water and flavor stabilization which are greater than with current binders such as non-fat dry milk.

As used herein, the term "extender" is defined as either a substance used in a meat emulsion to enable the meat emulsion to contain more water or fat with a minimal loss or separation during cooking or a substance used as an extender to extend portions of a scarce or expensive food by combining the same with inexpensive foods (Encyclopedia of Labeling Meat and Poultry Products, J. W. Bailey, DVM Meat Plant Magazine, 1974).

The present invention is further illustrated in the examples which follow.

EXAMPLES 1–3

Non-specific Loaves

Three non-specific loaf formulations were prepared to compare the partially soluble modified whey solids with calcium reduced non-fat dry milk (Savortex, Western Dairy Products). Each batch (formulation) of 9 kilograms (20 pounds) was prepared with fresh beef and pork in an amount sufficient to yield, with the other ingredients of the formulations, approximately 23% fat in the cooked product after a calculated 6% smokehouse shrink. The following formulations were prepared:

| NON-SPECIFIC LOAF FORMULATION | |
|---|---|
| INGREDIENTS | |
| Lean Beef (6% Fat) | 26.6 |
| Pork Trim (60% Fat) | 33.8 |
| Water | 22.0 |
| Corn Syrup Solids | 2.7 |
| Salt | 2.2 |
| Seasoning | 1.5 |
| Dextrose | 1.1 |
| Sodium erythorbate | 0.04 |

| NON-SPECIFIC LOAF FORMULATION | |
|---|---|
| INGREDIENTS | |
| Sodium nitrite | 0.01 |
| Protein Extender | 10.0 |

PROTEIN EXTENDER
Example 1 - Calcium reduced non-fat dry milk (Control)
Example 2 - Partially soluble modified whey solids prepared by adding $Ca^{++}$ to sweet whey and neutralizing at elevated temperature
Example 3 - Partially soluble modified whey solids prepared by neutralizing acid whey

PROCEDURE:

The meat was preground in a screw grinder with a plate having 3.125 millimeter (⅛ inch) openings for beef or 12.5 millimeter (½ inch) openings for pork. The preground meat was mixed with the other ingredients and reground through a plate havng 3.125 millimeter (⅛ inch) openings. Final meat temperatures ranged from about 4.4° C. to 7.2° C. (40° F. to 45° F.). Each batch was held overnight at 4.4° C. (40° F.), stuffed into casings and smoke-house processed as follows:

| | |
|---|---|
| 65.6° C. (150° F.) | 1 hour |
| 71.1° C. (160° F.) | 1 hour |
| 76.7° C. (170° F.) at 35% relative humidity | 1 hour |
| 80° C. (176° F.) at 40% relative humidity | 2 hours |
| 83.3° C. (182° F.) at 50% relative humidity | until internal temperature of 66.7° C. (152° F.) is reached. |
| Chill 4.4° C. (40° F.) | Overnight |
| Vacuum package | |

Yields were determined by weighing each piece before and after processing. The following results were obtained:

TABLE I

| NON-SPECIFIC LOAF PROCESSING YIELDS | | |
|---|---|---|
| PRODUCT | YIELD % | |
| Example 1 Control | 87.9 | |
| | 93.3 | |
| | 92.4 | Avg. = 91.3 |
| | 90.3 | |
| Example 2 | | |
| | 92.9 | |
| | 91.8 | Avg. = 92.1 |
| | 92.3 | |
| | 91.4 | |
| Example 3 | | |
| | 93.3 | |
| | 92.3 | |
| | 92.3 | Avg. = 92.3 |
| | 91.9 | |
| | 91.7 | |

The partially soluble modified whey solids exhibited more dusting during mixing than the control. The production mix prepared with the partially soluble modified whey solids were slightly drier than the control with the mix of Example 3 being the driest.

The final products were evaluated by 10 untrained panelists rating each product on a hedonic scale for color, texture, flavor, odor, juiciness, and general acceptance. The results are expressed as the average scores, and the rating average is the mean of the 6 average scores. Samples were presented as chilled slices.

The results are reported in Table II which follows:

TABLE II

| PREFERENCE EVALUATION NON-SPECIFIC LOAF | | | | | |
|---|---|---|---|---|---|
| Product | Color | Texture | Flavor | General Acceptance | Rating Average |
| Example 1 (control) | 7.5 | 4.9 | 6.2 | 5.7 | 6.1 |
| Example 2 | 7.2 | 5.9 | 6.8 | 6.6 | 6.6 |
| Example 3* | 7.2 | 5.8 | 6.4 | 5.9 | 6.3 |
| AFTER 30 DAYS | | | | | |
| Example 1 (control) | 6.2 | 4.4 | 6.0 | 4.9 | 5.4 |
| Example 2 | 6.7 | 5.8 | 6.3 | 5.9 | 6.2 |
| AFTER 38 DAYS | | | | | |
| Example 1 (control) | 6.5 | 4.6 | 6.1 | 5.0 | 5.6 |
| Example 2 | 6.6 | 5.5 | 6.2 | 5.4 | 5.9 |

*Evaluation Conducted separately, from the evaluation of Example, 1 and 2.

The partially soluble modified whey solids provided a luncheon loaf which scored significantly higher than the control in all parameters except color. While the texture of the control product was rated unacceptable, the texture of the product prepared in accordance with the invention was acceptable.

The non-specific loaves containing 10% partially soluble modified whey solids or the control were subsequently sliced and vacuum packaged or refrigerated at 3.3° C. to 4.4° C. (38° F. to 40° F.) for shelf-life evaluation. At the end of 30 and 38 days of storage, each product was again presented to 10 untrained panelists for preference evaluation.

As reported in Table II, after 30 days, both products received lower overall preference scores with the partially soluble modified whey solids product still the most acceptable. After 38 days, the two products received more comparable scores in all parameters except texture, where the partially soluble modified whey solids product was definitely superior. No major differences were noted after 38 days of storage.

EXAMPLES 4-7

FRANKFURTERS

Frankfurters were manufactured to compare partially soluble modified whey solids (Example 4) against a no additive control (Example 5), a sweet whey control (Example 6) and a calcium reduced non-fat dry milk control (Example 7). The ingredients and processing procedure were as follows:

| | | Composition (%) | | | |
|---|---|---|---|---|---|
| Ingredient | Amount Used | Ash | Protein | Fat | Water |
| Beef | 2.01 kg | 1 | 20.1 | 5.19 | 73.21 |
| Beef Heart | 0.669 kg | 0.8 | 15.77 | 16.01 | 67.42 |
| Pork | 1.61 kg | 0.5 | 17.80 | 17.14 | 64.56 |
| Pork Fat | 2.18 kg | 0.80 | 0.81 | 80.96 | 17.43 |
| Ice | 1.41 kg | | | | |
| Nitrate, Na | 0.996 gr | | | | |
| Nitrite, Na | 8.18 gr | | | | |
| Ascorbate, Na | 3.97 gr | | | | |
| Sugar | 128.0 gr | | | | |
| Salt | 162.0 gr | | | | |
| Spice | 34.0 gr | | | | |
| Protein | | | | | |

-continued

| Ingredient | Amount Used | Composition (%) | | | |
|---|---|---|---|---|---|
| | | Ash | Protein | Fat | Water |
| Extender 226.0 gr | | | | | |

PROTEIN Extender
Example 4 - Partially soluble modified whey solids
Example 5 - No additive (all meat)
Example 6 - Sweet whey
Example 7 - Calcium reduced dried skim milk

PROCEDURE:

All of the ingredients were placed in a vacuum chopper and chopped until the temperature increased from 0° C. to 15.6° C. (32° F. to 60° F.) (approximately 2½ minutes). A sample was taken to determine the viscosity and the remaining mixture was transferred to an extruder and links of standard size were prepared. The links were then transferred to the smoke house and heated as follows: 10 minutes at 54.4° C. (130° F.), 30 minutes at 62.8° C. (145° F.) and 45 minutes at 71.1° C. to 73.9° C. (160° F. to 165° F.).

After overnight storage, the frankfurters were evaluated for the presence of fat caps, shrinking, tenderness, and organoleptic properties. Results of the evaluation are given below:

TABLE III

| Example | 4 | 5 | 6 | 7 |
|---|---|---|---|---|
| Property | | | | |
| Chopping Time (Sec.) | 140 | 140 | 155 | 120 |
| Viscosity (BU)* | 78 | 74 | 72 | 80 |
| Fat caps per 20 links | 4 | 5 | 5 | 7 |
| Shrinking (%) (Wt. loss after smoking) | 10.4 | 9.5 | 9.6 | 8.8 |
| Skin tenderness kg. (lbs.) | 16.2(3.6) | 16.2(3.6) | 16.65(3.6) | 15.3(3.4) |
| Binding | | | More binding than Ex. 5 | Poor peelability poor binding |

*Brookfield Units

The use of partially soluble modified whey solids showed improved extension over the all meat control and the calcium reduced non-fat dry milk control. Measurement of fat caps is a means of evaluating fat emulsification. The higher the number of fat caps present, the poorer the emulsification. As can be seen from the data, only 4 fat caps are present using partially soluble modified whey solids whereas 7 fat caps are present using the calcium reduced non-fat dry milk.

As can be seen from the results set forth herein, the products of the invention provided acceptable non-specific loaves and frankfurters. The products of the present invention provided water loss and fat loss within an acceptable range to the non-fat dry milk control.

The invention is further defined in the claims which follow.

I claim:

1. A process for extending comminuted meat which comprises adding thereto a bindingly effective amount of partially soluble modified whey solids derived as a precipitate from a process selected from the group consisting of (1) adding a divalent metal ion to a cheese whey solution and adjusting the pH to a value between about 6 and about 8.0 to cause precipitation of the modified whey solids and (2) adjusting the pH of a cheese whey solution containing at least 20% acid cheese whey to a value of between about 6.0 and about 8.0 to cause precipitation of the modified whey solids said modified whey solids comprising about 23–54% lactose, about 24–60% minerals, and about 15–27% protein by weight, wherein said minerals comprise from about 6% to about 8% phosphorous, about 6 to about 12% calcium and about 1.3 to 1.5% sodium.

2. A comminuted meat product produced by the process of claim 1.

3. The process as recited in claim 1 wherein said modified whey solids is derived by adding a divalent metal ion to a cheese whey solution and adjusting the pH to a value between about 6 and about 8.0 to cause precipitation of the modified whey solids.

4. The process as recited in claim 1 wherein said modified whey solids is derived by adjusting the pH of a cheese whey solution containing at least 60% acid cheese whey to a value of between about 6.0 and about 8.0 to cause precipitation of said modified whey solids.

5. The process as recited in claim 4 wherein said cheese whey solution is 100% acid whey.

6. The process as recited in claim 1 wherein said comminuted meat is sausage.

7. The process as recited in claim 1 wherein said comminuted meat is non-specific loaves.

8. The process as recited in claim 6 wherein said bindingly effective amount is not more than 3.5% by weight based on the total weight of the sausage.

* * * * *